Dec. 29, 1970 J. BOUWMA 3,550,264

METHOD OF MANUFACTURING MAGNETIC HEADS

Filed June 2, 1967 3 Sheets-Sheet 1

INVENTOR.
JAN BOUWMA

BY

Frank R. Trifari

AGENT

INVENTOR.
JAN BOUWMA
BY
Frank R. Trifari
AGENT

INVENTOR.

JAN BOUWMA

BY

Frank R. Jufari

AGENT

United States Patent Office 3,550,264

Patented Dec. 29, 1970

3,550,264

METHOD OF MANUFACTURING MAGNETIC HEADS

Jan Bouwma, Emmasingel, Eindhoven, Netherlands, assignor, by mesne assignments, to U.S. Philips Corporation, New York, N.Y., a corporation of Delaware Filed June 2, 1967, Ser. No. 643,263
Claims priority, application Netherlands, June 23, 1966, 6608700
Int. Cl. H01f 7/06
U.S. Cl. 29—603 8 Claims

ABSTRACT OF THE DISCLOSURE

A magnetic head composed of two opposing pole pieces joined by glass bonding at the interface is accurstely assembled and gap depth accurately defined by the use of a central mandril arranged such that the head surfaces are parallel and symmetrical to the axis of rotation of said mandril. The assembly is ground circularly until the desired gap depth is obtained, after which the mandril is removed and the assembly cut.

The invention relates to a method of manufacturing magnetic heads consisting of at least two parts of easily magnetisable material enclosing a useful gap filled with non-magnetisable material, in which two parts of readily magnetisable material are each provided with an accurately machines, smooth surface.

In the manufacture of magnetic heads for playback, recording and/or erasing magnetic recordings on a record carrier it is often required that the heads to be manufactured with very small tolerances (10%) of the dimensions of the magnetically good conducting circuit parts and of the useful gap. Particularly, if a quantitatively constant relationship between the magnetisation of the carrier and the current passing through the coils arranged around the magnetic circuit of the head is required, said requirement is very severe. Such constant relationships are required, for example, if heads have to be exchangeable and if the record-carriers and the recording play-back apparatus have to be interchangeable.

Particularly with heads for recording or playing back high-frequency signals, for example, video signals, it is often difficult satisfy these requirements with respect to tolerances. The useful gap in the magnetic circuits of such heads has very small dimensions, for example, a length of the order if 1$\mu$ and a depth of, for example 25'$\mu$.

The invention relates to a method of manufacturing heads, in which as compared with the known methods, the depths of the useful gaps of the heads can be accurately made equal in a comparatively simple and hence cheaper manner.

In known methods the magnetic heads are manufactured as follows: the method starts from the blocks of readily magnetisable for example, sintered, oxidic, ferromagnetic material, each of which is provided with a perfectly smooth surface. The surface of at least one of these blocks is profiled in the form of a gutter, care being taken that the edges of the gutter, that is to say, the lines of intersection of the upright walls of the gutter with the smooth surface, are accurately straight and sharp. The term "sharp" means herein that the edges do not exhibit irregularities. When adjusting the gap depth, these gutter edges may be employed as datum lines. Then the two blocks are joined by their smooth surfaces, while a foil of filling material and, if desired, spacers are interposed. The assembly is then heated under pressure at a temperature at which the filling material of the gap, for example glass, melts and spreads homogeneously between the surfaces, after which the assembly is cooled.

In this manner a body having two gaps of the desired length is obtained; it may serve as a starting means for the manufacture of polepiece units for two magnetic heads and, if the dimensions of the body allow this, it may even be used for the manufacture of polepiece units of 2$n$ ($n$ is an integer) magnetic heads.

The resultant "crude" polepiece units are then provided with a contact surface, while the depth of the gap is adjusted by grinding off to an extent such that the distance of the resultant contact surface from the aforesaid datumline has the desired value.

These "crude" polepiece units may be ground separately. In this case the required equality of the gap depth can be realized only by time-consuming operations. As an alternative, if the units are made from a larger body, all heads may be ground simultaneously. This has the advantage that all units are subjected to the same machining operation. A disadvantage is, however, that during the grinding process the gap depth has to be measured repeatedly in order to stop the grinding at the required depth. These measurements of the gap depth have to be carried out with the aid of a microscope, which takes much time and is costly. Moreover, microscopic measurement is only effective, if the distance to be measured is accurately defined, which means that in an intermediate stage of the process surfaces have to be polished.

In a further method it is known to obtain the correct height of the gap by first providing a "crude" polepiece unit or, as described above, a few polepiece units simultaneously with a contact surface, the smoothness and curvature of which satisfies the requirements, after which grinding is performed from the lower side, that is to say, from the side of the gap remote from the contact surface. In this case a datumline on the lower side of the gap is not required, and located on the side of the gap, where the contact surface is provided, is employed. This reference surface may be formed by the ground surface of a jig, which fits with a concave surface around the convex contact surface. This ground surface is located opposite the concave surface and is at right angles to the boundary surface of the gap. Although this method has certain advantages, inter alia consisting in that, when the gap height is adapted to its desired size, it is not necessary to give attention at the same time to the shape and the smoothness of the contact surface, since it has previously been shaped in its definite form, there remains the disadvantage that during the grinding process the gap depth has to be measured several times, which involves the difficulties described above.

According to the invention the aforesaid difficulties involved in the manufacture of various heads of equal gap height are eliminated and the method according to the invention is characterized in that use is made of a mandril. The farthest remote lines of intersection of the profile(s) with the surface(s) are arranged accurately parallel and symmetrical to the axis of rotation of said mandril. Around the axis the body is ground circularly until the desired gap depth is attained, after which the mandril is removed and the assembly is cut, preferably at right angles to the boundary-faces of the gap, while the heads are completed by means of magnetic shunts and coils.

The gap depth is thus made to its correct value from the upper side, that is to say, from the side of the contact surface of the head. Since the two datumlines, i.e. the lines of intersection of the profiles and the surface are accurately parallel to the axis of rotation of the mandril and at equal distances therefrom, precisely the same gap depth will be produced when the body is ground for example on a circular grinding machine, and the contact surfaces on both sides will be curved uniformly (cylindrically). The disadvantage of the known methods, i.e.

that during the grinding process the gap depth has to be measured repeatedly, is not involved in the method according to the invention, since after the definite adjustment of the circular grinding machine to a given gap depth, the machine can be used many times for the same process, and thus the required gap depth is guaranteed.

According to the invention said mandril can be arranged in two ways; it may be divided in its direction of length, the body to be ground being clamped between these parts, or the mandril may be arranged through the body.

The first-mentioned method is advantageously employed, if the space between the two parts of readily magnetisable material is too small for accommodating a mandril or if the over-all structure is too weak for using a central mandril. In other cases the second method will be preferred, since it is cheaper than the first method.

In order to carry out successfully said method, the two parts of readily magnetisable material forming the body to be ground circularly have to be accurately positioned relative to each other. Since the body is formed by pressing, while heating the two parts after the interposition of material (in general a glass foil in conjunction with spacers) for the formation of the useful gaps and by cooling them subsequently, the great problem is to hold the two parts in the correct relative positions.

According to the invention this problem is solved by causing a centering body to prevent relative movement of the parts in the direction of the gap depth during compression-heating and the subsequent cooling to form the useful gap. In general, this centering body is arranged at the same place as the mandril to be arranged later during the grinding process. According to the invention the centering body is formed by a jig in which fit the parts or by a beam arranged between the two parts.

Since also the centering body is subjected to heating and cooling applied to the parts, it is advantageous in accordance with the invention to use a centering body made of the same material as the readily magnetisable parts. Stresses due to differences between expansion coefficient which might give rise to deformation or fracture are thus avoided.

The invention furthermore relates to a magnetic head manufactured by one or more of the methods described above.

The invention will be described more fully with reference to the drawing, which shows embodiments of the methods according to the invention and in which FIGS. 1*a*, *b*, *c* show a manufacturing stage of one or more magnetic heads according to the invention, in which a centering beam is employed.

Figures 1A, 1B, 1C:
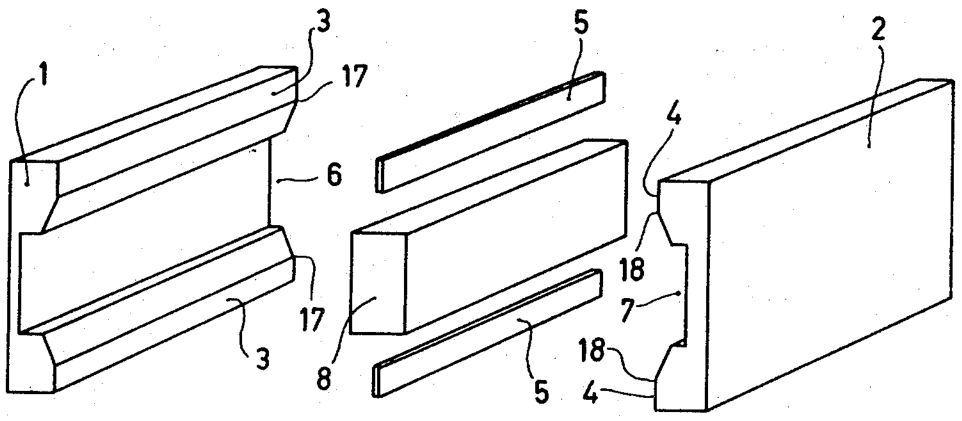

FIGS. 1*a* and 1*c* show the two parts of readily magnetisable material 1 and 2, each having a surface 3 and 4 respectively machined to perfect smoothness and pressed against each other, while heated and after the interposition of material 5 of FIG. 2*b*, for example glass foils, and then cooled. The readily magnetisable material is preferably sintered, oxidic ferromagnetic material. The two parts 1 and 2 are each provided with a gutter-shaped profile 6 and 7 respectively. When the parts 1 and 2 are secured to each other in the manner described it is advantageous to use a centering body 8, arranged between the two parts 1 and 2 so as to fit in the gutters 6 and 7. During heating and subsequent cooling this centering body prevents the parts 1 and 2 from relatively shifting in the longitudinal direction of the gap to be provided.

Figures 2, 3:
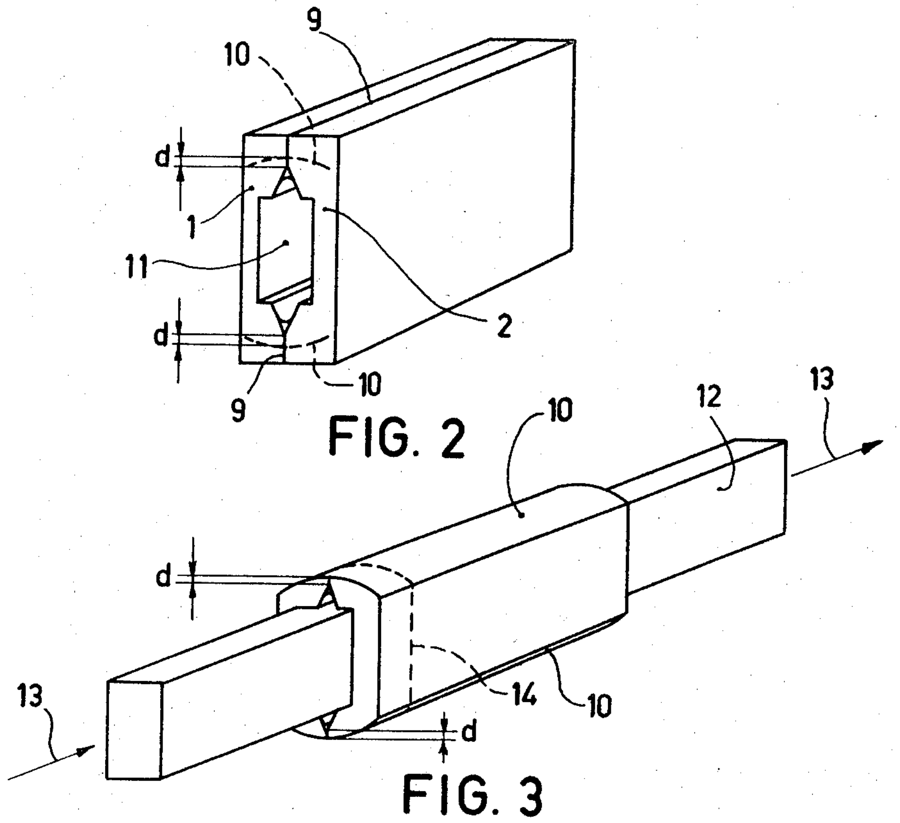
FIG. 2 illustrates a next manufacturing stage of magnetic heads according to the invention, the gaps being formed and the centering beam being removed.
FIG. 3 shows the manufacture of magnetic heads in a later stage, while circular grinding is carried out around the longitudinal axis of a mandril passed through the body.

FIG. 2 shows the body obtained by the method described above, after the centering body 8 is removed. Between the two parts 1 and 2 are now formed gaps 9, filled with glass. The body has then to be worked so that the curved surfaces 10 are obtained, along which the record carrier moves in operation while the gap depths $d$ obtain the accurate desired dimensions. For this purpose the opening 11, where the centering body was located during the manufacture of the body, receives a mandril 12 of the kind shown in FIG. 3. Around the axis 13 of the mandril 12 the body is turned on a circular grinding machine, so that the contact-surfaces 10 are formed and the gap heights $d$ are accurately determined.

In order to ensure equal depths $d$ of the gap on either side, the lines of intersection 17 and 18 of the profiles with the surfaces 3 and 4 have to be accurately parallel and symmetrical to the rotary axis 13 of the mandril 12 to be inserted. By means of known techniques this requirement can be satisfied.

A centering body 8, arranged in FIG. 1 between the parts 1 and 2, may also be arranged on the outer sides of the parts 1 and 2. It may then be formed by a jig into which the parts are fitting.

Figure 4:
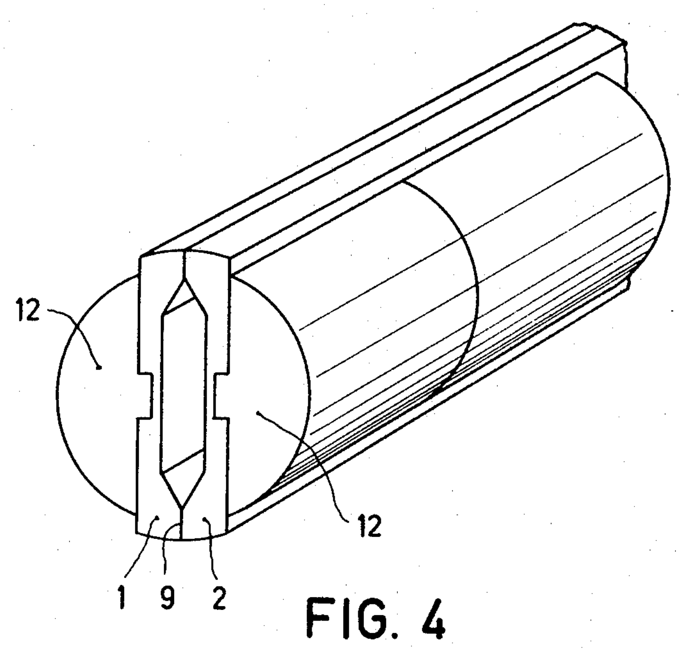
FIG. 4 shows the same stage as FIG. 3 with an external mandril.

Instead of being passed through the body, the mandril may be arranged on either side thereof. If the body is mechanically weak, this is preferred. The mandril 12 is then divided in its longitudinal direction. The latter is shown in FIG. 4.

Figure 5:
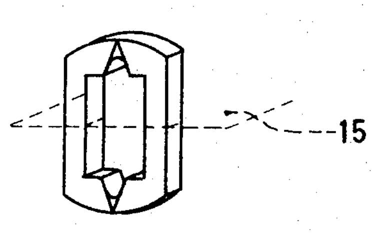
FIG. 5 shows a correctly ground and subsequently sawed body.
Figure 6:
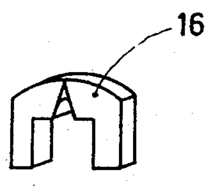
FIG. 6 shows a pole piece unit obtained from the body of FIG. 5.

After grinding to roundness and after the gap depths $d$ have been made to the accurate values, the mandril 12 is removed and the body is sawed along planes 14, so that the structure shown in FIG. 5 is obtained. This structure is sawed along a plane 15, so that two polepiece units 16 are formed. A polepiece unit 16 is completed in known manner by means of a shunt and coils to form the magnetic head.

Figure 7:
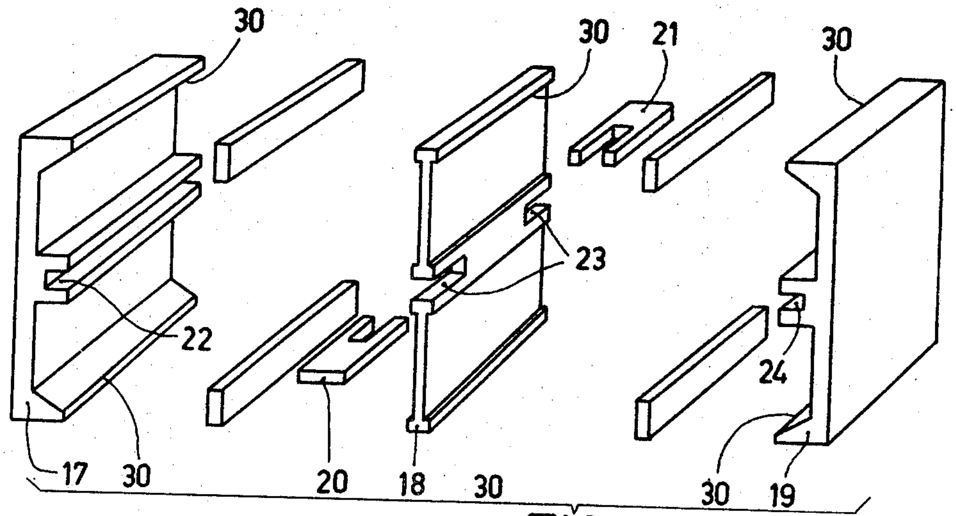
FIG. 7 shows a manufacturing stage of a multi-track head having for each track a recording and a playback head.

FIG. 7 illustrates how a head having useful gaps located one after the other in the direction of movement of the record carrier can be manufactured in a similar manner. Instead of using two parts at the beginning, three parts 17, 18 and 19 of readily magnetisable material have to be employed. In this embodiment the parts 17 and 19 each have three gutter-shaped profiles, whereas the centering body comprises two parts 20 and 21, which fit in the profiles 22, 23 and 24 of the parts 17, 18 and 19.

Figure 8:
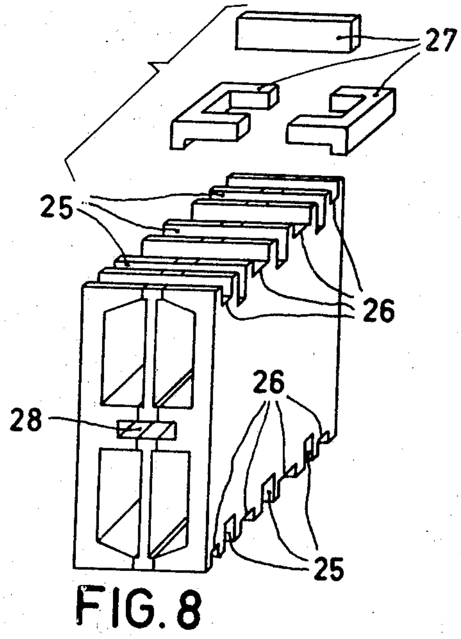
FIG. 8 shows a further manufacturing stage of the magnetic head of FIG. 7.

When the parts 17, 18 and 19 of FIG. 7 are united in one body and when the centering body is removed as is shown in FIG. 8, the upper and lower faces are provided with recesses 25 and 26 at right angles to the gaps between the parts, which recesses are filled out with non-magnetisable material 27 in order to separate magnetically from each other, in the ready head, adjacent circuits in the direction of the gap width, associated each with a different signal track of the record carrier.

Figure 9:
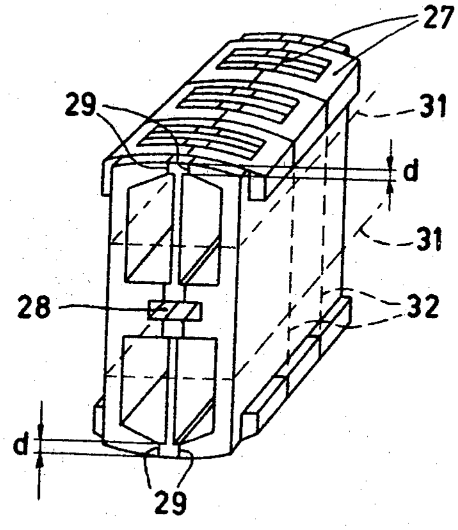
FIG. 9 shows a still further manufacturing stage of the magnetic head of FIG. 7.

Then a mandril is inserted into the recess 28. This mandril like the centering body consists of two parts in the case shown. Around the rotary axis of this mandril the assembly is ground circularly and as is shown in FIG. 9 a cylindrical contact surface is formed on either side of the body, while at the same time the gap depths $d$ are brought to the correct values.

In order to obtain accurately equal depths $d$ of the gaps 29 on either side of the body, the farthest remote lines of intersection 30 of the profiles in the parts 17, 18 and 19 have to be accurately parallel and symmetrical to the rotary axis of the mandril.

Figure 10:
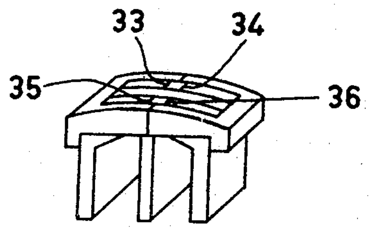
FIG. 10 shows a polepiece unit of the head of FIG. 7.

After the resultant assembly is sawed along the planes 31 and 32, polepiece units as shown in FIG. 10 are obtained. In known manner the polepiece units shown in FIG. 10 is used to make a magnetic head, the useful gaps 33 and 34 of which are associated with one track of the record carrier, whereas the useful gaps 35 and 36 are associated with a second track.

What is claimed is:

1. A method of manufacturing a magnetic head having a body of two parts of magnetizable material having boundary surfaces enclosing a useful gap and having first and second portions of said surface defining a gap depth, comprising the steps of placing said surfaces adjacent one another with the interposition of a centering body, bonding said surfaces together, removing said centering body, placing a mandril onto said body with the surfaces of said body arranged parallel and symmetrical to the rotary axis of said mandril, grinding said body to roundness about said axis until the desired gap depth is attained, and removing said mandril.

2. A method as claimed in claim 1 wherein the mandril is divided in its longitudinal direction into two segments and the body is clamped between said segments.

3. A method as claimed in claim 1 wherein the mandril is passed through the body.

4. A method as claimed in claim 1 wherein both parts have at least one gutter-shaped profile, and wherein said parts are compressed, heated and cooled to form the useful gap, said centering body preventing the parts from moving relative to each other in the direction of the depth of the gap.

5. A method as claimed in claim 4, wherein the centering body is formed by a jig into which the two parts fit.

6. A method as claimed in claim 4, wherein the centering body is formed by a beam.

7. A method as claimed in claim 4, wherein the centering body is made of the same material as the parts of readily magnetisable parts.

8. A method of manufacturing a magnetic head having a body of two parts of magnetizable material having boundary surfaces enclosing a useful gap and having first and second portions of said surface defining a gap depth, comprising the steps of placing a gutter along the surface portion of at least one of said surfaces, placing said surfaces adjacent one another with the interposition of a centering body along said gutter, bonding said surfaces together, removing said centering body, placing a mandril onto said body with the surfaces of said body arranged parallel and symmetrical to the rotary axis of said mandril, rotating said mandril about said axis, grinding said body to roundness about said axis until the desired gap depth is attained, and removing said mandril.

References Cited

UNITED STATES PATENTS

| | | | |
|---|---|---|---|
| 2,921,143 | 1/1960 | Selsted et al. | 179—100.2 |
| 3,417,465 | 12/1968 | Glass | 29—603 |
| 3,239,914 | 3/1966 | Shirakura et al. | 29—603 |
| 3,126,615 | 3/1964 | Duinker | 29—603 |
| 3,249,987 | 5/1966 | Duinker | 29—603 |
| 3,353,261 | 11/1967 | Bradford et al. | 29—603 |
| 3,375,575 | 4/1968 | Visser et al. | 29—603 |

OTHER REFERENCES

IBM Tech. Disclosure, vol. 8, No. 10, March 1966, by H. Reich, p. 1317.

JOHN F. CAMPBELL, Primary Examiner

C. E. HALL, Assistant Examiner

U.S. Cl. X.R.

179—100.2

UNITED STATES PATENT OFFICE

CERTIFICATE OF CORRECTION

Patent No. 3,550,264 Dated Decmeber 29, 1970

Inventor(s) Jan Bouwma

It is certified that error appears in the above-identified patent and that said Letters Patent are hereby corrected as shown below:

Column 2, line 35, after "and" insert -- a reference surface --.

Signed and sealed this 25th day of July 1972.

(SEAL)
Attest:

EDWARD M.FLETCHER,JR.
Attesting Officer

ROBERT GOTTSCHALK
Commissioner of Patents